United States Patent Office 3,357,283
Patented Dec. 12, 1967

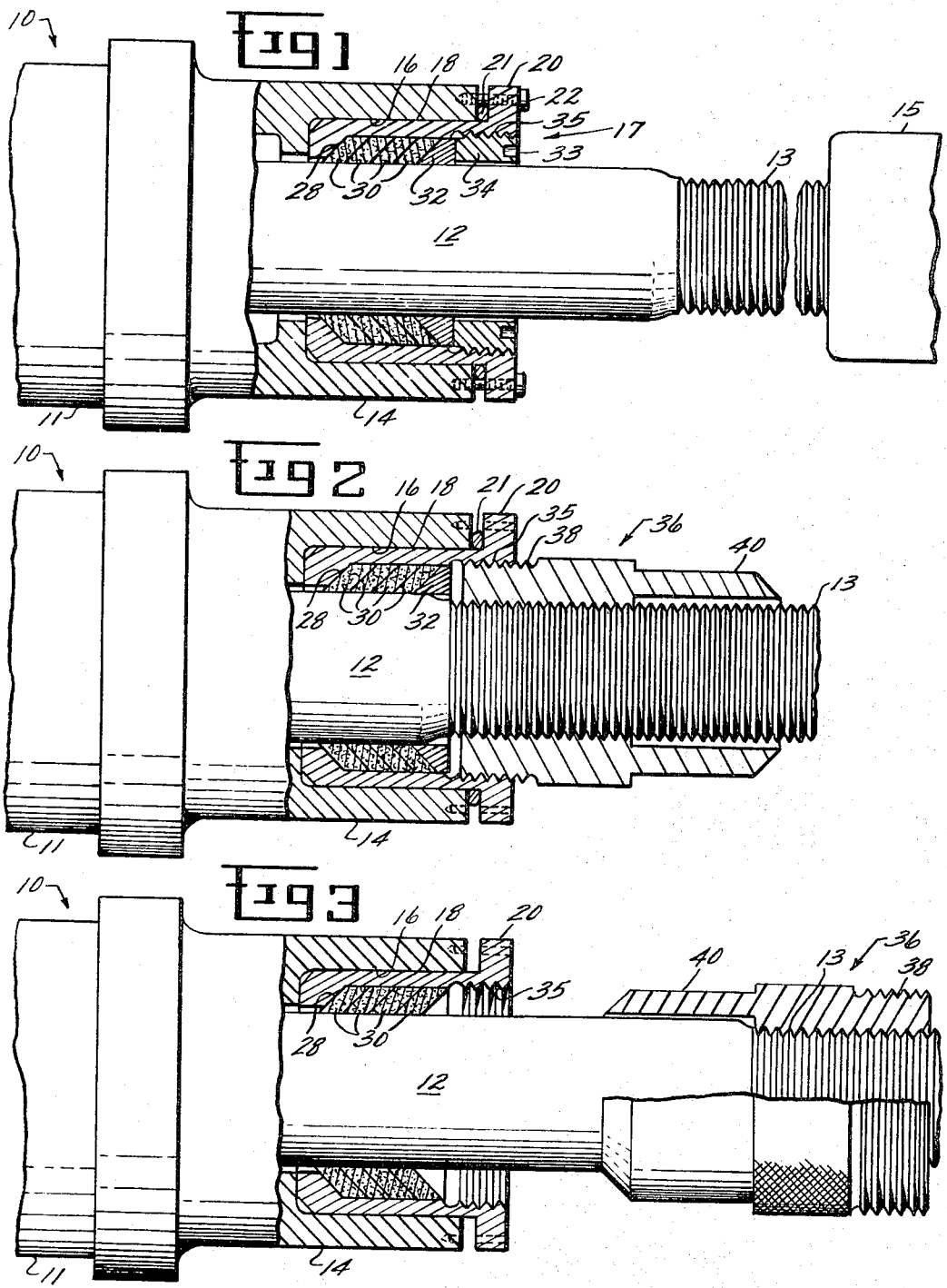

3,357,283
APPARATUS FOR REPLACEMENT OF SEALS
Howard M. Geyer, Dayton, Ohio, and James C. Frewin, Schenectady, N.Y., assignors to General Electric Company, a corporation of New York
Filed July 1, 1966, Ser. No. 562,405
7 Claims. (Cl. 81—8.1)

The present invention relates to apparatus for replacing seals and more particularly to apparatus for replacing actuator seals.

Actuators of the type that have a piston rod displaceable in response to pressurized hydraulic fluid have seals for preventing fluid leakage past the opening where the piston rod extends from the actuator. During a normal lifetime of operation, actuator seals are periodically replaced.

In the past, replacement of an actuator seal could be a very lengthy and expensive operation because actuators had to be completely removed from the apparatus they were powering and placed in a press or other device, used to replace the seal. The removal of an actuator from an aircraft for seal replacement, for example, requires disconnecting a complex network of hydraulic lines and removing access panels. The manpower required to effect this removal may be substantially more expensive than the price of the seal itself. Furthermore, the length of time required for the complete operation may substantially increase the maintenance time for aircraft, thus impairing a commercial aircraft's profitability.

Accordingly, it is an object of the present invention to replace actuator seals without removal of the actuator from the apparatus it powers, and to do so in a simplified, economical, accurate fashion.

The above ends are achieved by providing, for use in combination with an actuator of the type which is energizeable to selectively displace a piston rod extending therefrom toward extended and retracted positions and which includes a seal surrounding said rod, means for replacing the seal which comprises a collar detachably connectable to the piston rod. The collar has thereon means selectively connectable with the seal for extracting the seal upon energization of the actuator to extend the rod. The collar, in addition, has means selectively engageable with the seal for compressing the seal when the actuator is energized to retract the piston rod. The force of the actuator, therefore, is employed for replacement of the seal.

The above and other related objects and features of the invention will be apparent from a reading of the following description of the disclosure found in the accompanying drawings and the novelty thereof pointed out in the appended claims.

In the drawings:

FIGURE 1 is a partial, longitudinal section view of an actuator in which the present invention may be employed;

FIGURES 2 and 3 illustrates an embodiment of the present invention used to replace a seal of the actuator shown in FIGURE 1.

FIGURE 1 illustrates an actuator 10 having a piston rod 12 extending from a piston (not shown) slidable in a cylinder 11. Rod 12 extends through a cap at 14 at one end of the cylinder for threaded connection with a rod 15, suitably connected to a device powered by the actuator 10.

The actuator 10 is energized to displace the rod 12 towards an extended or retracted position by selectively directing pressurized fluid to opposite ends of the cylinder 11.

The cap 14 has a bore 16 in which a packing assembly 17 is disposed to surround the rod 12 and prevent fluid leakage from the actuator 10. The packing assembly 17 comprises a cartridge 18 telescoped into the bore 16 and sealingly held therein by means of screws 22 which compress a seal ring 21 between a flange 20 of the cartridge 18 and the cap 14.

The side wall of the cartridge 18 is spaced away from the piston rod 12 in order to receive therebetween a series of packing rings 30 and a backup ring 32. These rings are retained within the cartridge 18 by its inner end wall 28 and a nut 34 which is screwed into threads 35 at the outer end of the cartridge 18.

Reference is now had to FIGURES 2 and 3 which show a collar 36 threadable on the piston rod 12. The collar 36 has a threaded end 38 for connection with threads 35 and the outer end of the cartridge 18 and an opposite end portion 40 adapted to telescope into the cartridge 18 and engage the packing rings 30. The collar 36 enables replacement of the packing assembly 17 in situ in a manner now to be described.

Should leakage of pressurized fluid be experienced when the actuator 10 is installed in the field, the rods 12, 15 are disengaged and the nut 34 is removed by means of a spanner wrench (not shown) which is adapted to engage holes 33 in the nut 34. The screws 22 are removed from the caps 14 and the collar 36 is threaded onto the rod 12 so that threads 38 face the cartridge 18 and the collar 36 is spaced from the base of the threads on rod 12.

The actuator 10 is then energized to retract the piston rod 12 to the position shown in FIGURE 3 wherein the collar 36 may be screwed into the cartridge 18 to securely lock the cartridge 18 on the piston rod 12. The actuator 10 is then energized to extend the rod 12, thus extracting the cartridge 18 from the cap 14.

After the old cartridge is removed, a new cartridge is hand-fitted into the bore 16 and secured therein. The packing rings 30 are inserted into the cartridge 18 and the collar 36 is threaded onto the rod 12 so that the end portion 40 faces the cartridge 18, as shown in FIGURE 3.

The actuator 10 is then energized to retract the piston rod 12, which causes the end portion 40 of the collar 36 to compress the packing rings 30 against the cartridge end wall 38. The end portion 40 preferably has a conical end face for providing even compression of the packing rings 30. The end wall 28 likewise has a conical shape to enable the packing rings, when compressed against the wall 28, to sealingly engage the rod 12 by wedge action. In many cases it is preferable to cyclically compress the packing rings 30 to achieve a more effective seal.

It should be noted at this point that when the actuator 10 is energized to retract the piston rod 12, pressurized fluid is directed to the end of the cylinder 11 which is sealed by the packing assembly 17. During the initial displacement of rod 12 towards the retracted position, the packing rings 30 have not yet been compressed into sealing engagement with the rod 12. As a result, a relatively small amount of pressurized fluid leaks past the packing rings 30 and cylinder 11. However, the initial sealing effect of the rings 30 is sufficient to enable a pressure buildup in the cylinder 11 to compress the packing rings into full sealing engagement with the rod 12 with little or no fluid leakage.

After the packing rings 30 are compressed into full sealing engagement with the rod 12, the collar 36 is removed, the backup ring 32 is slipped into the cartridge 18, and the nut 34 is screwed into the cartridge 18 to hold the packing rings in sealing engagement. The rod 15 is threaded onto rod 12 to place the actuator 10 in the operative state shown in FIGURE 1.

It can be seen that significant advantages are obtained by the use of the detachable collar 36 in employing the force of the actuator 10 for the replacement of an actuator seal in the field. The piston rod is displaced in a straight line which insures removal of the cartridge from the bore 16 without binding and uniform compression of the packing rings 30 during installation. Furthermore, by controlling the pressure levels of the fluid used to energize the actuator 10, very precise, predetermined forces exerted by the actuator 10 in removal and installation are obtained.

Modifications of the described, preferred embodiment will occur to those skilled in the art and the scope of the invention is therefore to be derived solely from the following claims.

Having thus described the invention, what is claimed as novel and desired to be secured by Letters Patent of the United States is:

1. For use in combination with an actuator of the type which is energizable to selectively displace a piston rod extending therefrom towards extended and retracted positions and which includes a seal surrounding said rod, means for replacing said seal comprising,
a collar detachably connectable to said piston rod,
said collar having thereon means selectively connectable with said seal for extracting said seal upon energization of said actuator to extend said rod,
said collar further having means selectively engageable with said seal for compressing said seal when said actuator is energized to retract said piston rod,
whereby the force of said actuator is employed for replacement of said seal.

2. Apparatus as in claim 1 wherein,
said collar and said rod have cooperating threads for providing said detachable connection therebetween.

3. Apparatus as in claim 2, further comprising,
a cartridge telescoped into said actuator and surrounding said seal,
whereby said cartridge and said seal are extracted from said actuator as a unit when said actuator is energized to extend said rod.

4. Apparatus as in claim 3 wherein,
said cartridge and said collar have cooperating threads providing means for selectively connecting said seal to said collar.

5. Apparatus as in claim 3 wherein,
said cartridge has an open outer end and has an inner wall opposite said opening against which said seal is compressed for providing sealing engagement with said rod,
said means selectively engageable with said seal comprises an end portion adapted to telescope into the open end of said cartridge and engage said seal.
said end portion having the surface engaging said seal configurated for equal compression around the circumference of said seal,
whereby the sealing engagement of said seal with said rod is maximized.

6. Apparatus as in claim 5 wherein,
said inner wall of said cartridge converges towards said rod for urging said seal into sealing engagement with said rod when said seals are urged against said wall.

7. Apparatus as in claim 6 wherein,
the open end of said cartridge and the end of said collar opposite said end portion have cooperating threads for providing means for selectively connecting said seal to said collar.

References Cited

UNITED STATES PATENTS 2,763,055   9/1956   Hardy _____ 29—450
3,217,394  11/1965   Castoe _____ 29—252

OTHELL M. SIMPSON, *Primary Examiner.*

UNITED STATES PATENT OFFICE
CERTIFICATE OF CORRECTION

Patent No. 3,357,283                              December 12, 1967

Howard M. Geyer et al.

It is hereby certified that error appears in the above numbered patent requiring correction and that the said Letters Patent should read as corrected below.

Column 3, line 36, after "seal," insert the following as a new paragraph:

said cartridge being adapted for receiving said selectively connectable means,

Signed and sealed this 21st day of January 1969.

(SEAL)
Attest:

Edward M. Fletcher, Jr.                                         EDWARD J. BRENNER
Attesting Officer                                                    Commissioner of Patents